United States Patent [19]

Roberts et al.

[11] Patent Number: 4,900,935

[45] Date of Patent: Feb. 13, 1990

[54] AUTOMATED SCANNING OF TRACK RECORDERS HAVING VARIABLE TRACK DENSITY

[76] Inventors: James H. Roberts; Raymond Gold, both of Metrology Control Corp., 2000 Logsdon Blvd., Richland, Wash. 99352

[21] Appl. No.: 274,850

[22] Filed: Nov. 22, 1988

[51] Int. Cl.$^4$ ............................................... G01T 1/02
[52] U.S. Cl. .............................. 250/472.1; 250/473.1
[58] Field of Search ............. 250/390.03, 474.1, 472.1, 250/473.1; 356/444; 376/254

[56] References Cited

U.S. PATENT DOCUMENTS

| | | | |
|---|---|---|---|
| 4,385,237 | 5/1983 | Drukaroff et al. | 250/474.1 |
| 4,536,841 | 8/1985 | Wacchter et al. | 250/370.05 |

OTHER PUBLICATIONS

Robinson et al, "A Novel Track Etch Technique for Neutron Measurements", Proceedings 5th International Betatron Sym., Bucharest, Rumania, Oct. 18–23, 1971, pp. 497–503.

Somogyi et al, "Alpha Radiography With Plastic Track Detector", Int. J. App. Rad. and Isotopes, 22, 1971, pp. 289–299.

Primary Examiner—Carolyn E. Fields
Attorney, Agent, or Firm—Keith S. Bergman

[57] ABSTRACT

A method is presented to scan fission tracks in solid state track recording material that provides a high degree of accuracy. Three separate methods of estimating true track density are used, each in its range of greatest reliability. The first method for low track density directly observes tracks and counts them. The second method for ranges of medial track density uses the Buffon needle method of determining the probability of track pile up to determine true track density. The third method, which is applicable at high track density, measures the amount of transmitted light to determine the opaque track area and relates this to true track density. The three methods are complimentary to each other and one of the set is automatically applied to any measured areal unit. The method is applied with known apparatus.

5 Claims, 2 Drawing Sheets

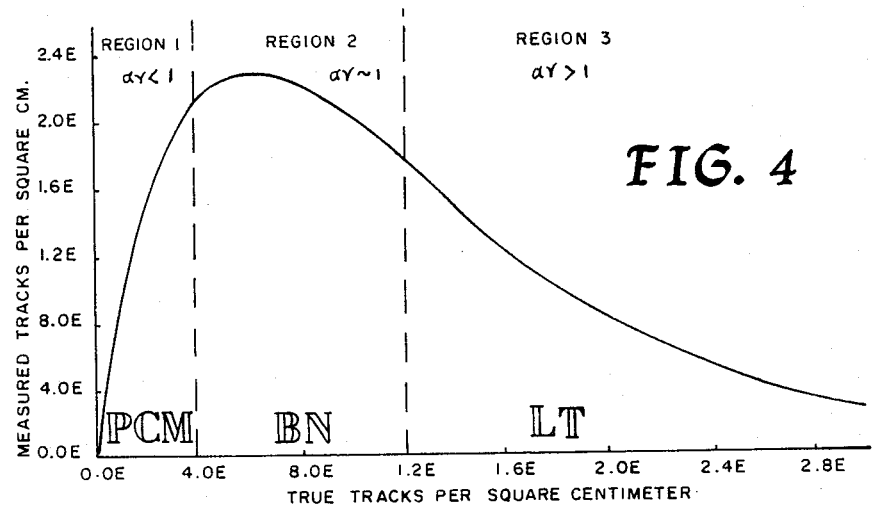
FIG. 4
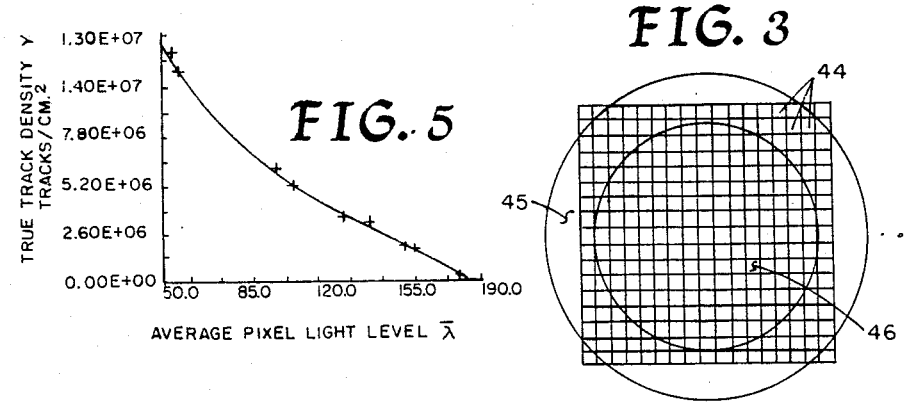
FIG. 5
FIG. 3
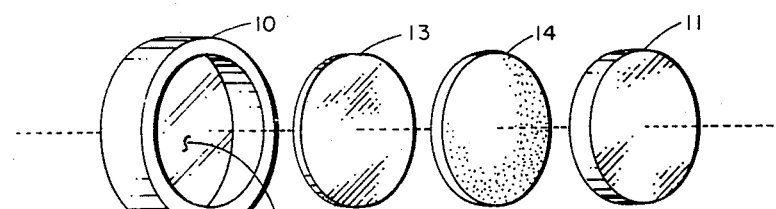
FIG. 1

AUTOMATED SCANNING OF TRACK RECORDERS HAVING VARIABLE TRACK DENSITY

BACKGROUND OF INVENTION

1. Related Applications

There are no applications heretofore filed in this or any foreign countries relating to the instant invention.

2. Field Of Invention

This invention relates generally to the counting of tracks in solid state recording material and more particularly to a process using multiple determination methods, each selected within its range of greatest accuracy.

3. Description Of The Prior Art

In operating light water reactor nuclear power plants, neutron radiation causes embrittlement of pressure vessels and their support structures. Since these are non-replaceable power plant components, the embrittlement may limit the effective operating life-time of a power plant. In recognition of this problem, various governmental regulatory bodies have established programs for improving, maintaining and standardizing neutron dosimetery for damage correlation and associated reactor analysis procedures used for predicting the effect of neutron exposure on pressure vessel structures in light water reactors.

In the recent past, neutron induced embrittlement of pressure vessels has been recognized as a serious problem and both surveillance and regulation of pressure vessels involved have increased stringently. With these increases in both activities, it has become increasingly necessary to have reliable methods of measuring the neutron radiation involved and it has simultaneously been found that the methods of measurement heretofore used have not been particularly accurate.

In the more distant past, surveillance neutron dosimetry has been carried out with radiometric (RM) dosimeters but in the more recent past, these have been replaced with solid state track recorder (SSTR) neutron dosimeters. The SSTR's comprise transparent dielectric track recorder material, such as mica, quartz or plastic, placed in intimate contact with a source or deposit in which neutrons react to produce charged particles, such as alpha particles or fission fragments, which in turn enter the track recorder material where they are registered. The SSTR is subsequently chemically processed by suitable etching techniques to visually reveal fission or alpha tracks at the registration sites. These tracks then are quantitatively scanned by manual or automated methods to obtain a measure of track density, which in turn is a measure of the neutron exposure experienced during radiation.

SSTR neutron dosimeters have significant advantages over the RM dosimeters and have largely now, and will continue to, replace those latter devices. With SSTR's, the sensor material can be very special actinide isotopes, such as NP-237 and U-238, which are of extremely high isotopic purity. Though such materials are precious and their supplies limited, the amount used in SSTR's is relatively low and actually allows production of such devices at costs lower than those of the RM type. In fact, if RM devices were to operate with these materials, the commercial supply required for pressure vessel surveillance work alone would deplete the world supply after use in only a few plants.

Secondly, SSTR dosimeters possess a greater efficiency of use than the RM devices. The process is sensitive enough to permit surveilance on the outside of a pressure vessel, in the reactor cavity formed between the pressure vessel and the biological shield. Surveillance with radiometric devices has heretofore been conducted only inside the pressure vessel where neutron intensity is considerably higher. This allows the SSTR to be placed with much simpler access and also provides reduced radioactivity, both of which lead to lower cost.

Thirdly, SSTR dosimeters possess lower radioactivity then the radiometric variety. This advantage lessens possibility of personnel radiation exposure, simplifies shipping, and reduces compliance requirements with various applicable regulations.

Automated counting systems for quantitatively scanning SSTR's started in about 1970 and considerable progress has been made to date. Difficulties still exist, however, for automating scanning systems, especially for SSTR's that possess non-uniform track density. This non-uniform track density may be produced either by non-uniformity in the deposit of the fission material of the SSTR or in spatial variation of impinging neutron intensity. In either event, the existence of non-uniform SSTR track density, especially that associated with fissionable deposits which have been prepared by electro-deposition, is more the rule than the exception. To overcome this difficulty and thereby allow the obvious benefits of SSTR dosimetry for light water reactor pressure vessel surveillance work, we have developed a new and novel quantitative method for scanning fission tracks in non-uniform SSTR's. Our process introduces unique and non-obvious methods of both data acquisition and data analysis, as herein specified.

Track density is determined in a recorder medium by optically scanning, with the aid of a microscope, plural individual areas of a recorder media and then summing tracks in those individual areas to obtain the track density of the entire area. This scanning is, in modern day practice, accomplished by a computer driven microscope which presents an electro-visual display wherefrom the optically distinguishable fission tracks are counted by known electro-mechanical methods.

The true number of radiation tracks is then determined by appropriate analysis from the actual track count. In relating measured track density to actual track density, it is to be remembered that the tracks being measured exist in generally random orientation in three dimensional space in the recording material, but in making optical measurements of those tracks, such measurements are made in only two dimensional space so that oftentimes for this or other reasons two or more tracks may merge because of spatial overlapping to form what would appear in optical scanning to be only a single track. To complicate the matter further, the practice in optical scanning, largely for reasons of convenience and simplicity, has been to treat any single continuous track, whatever its configuration, as being a single track. These factors all tend to make the observed number of tracks smaller than the actual number of tracks present and appropriate corrections have heretofore had to be applied to obtain a true track count. The methods of such analysis as heretofore used have oftentimes created substantial inaccuracies in the track measurement process and those inaccuracies are sought to be eliminated by our instant invention.

SUMMARY OF INVENTION

Our invention generally provides a method of measuring non-uniform distributions of fission tracks in optically transparent track recording material. The method divides individually measured areas into three separate classes, based on track density, and then applies to each area one of three separate methods of determining track count in that area based upon the accuracy of the method relative to that class of track concentration.

Each of the three methods is more accurate than the others in particular areas of track density. We use the paralyzable counter model method, as heretofore known, in measuring track densities in the lower density ranges. We use a Buffon needle method of measuring track densities in the medial range and we use a light transmission method of measuring track densities in the high density range. Parameters are established to determine which counting method should be used in any particular measuring area. The results of measurements in all areas are then combined to produce a total true track count of a particular recorder.

The process is carried out with existent track recording material and by use of known apparatus.

In providing such a process, it is:

A principal object of our invention to measure non-uniform densities of fission tracks in optically transparent solid state track recording material with a high degree of accuracy by using traditional optical scanning methods.

A further object of our invention to provide plural methods of determining true track density from observed track density which are separately applied to small areas of recording material based upon the greater accuracy of that method in that area.

A still further object of our invention to provide a method of measuring true track density from two dimensional scanning of track recorders by means of the amount of light transmitted through a measured area.

A still further object of our invention to provide such a process that is new and novel, of accurate and quantitative nature, of simple and economic use and is otherwise well suited to the uses and purposes for which it is intended.

Other and further objects of our invention will appear from the accompanying drawings, specification and claims. It should be remembered, however, that the essential features of our invention are subject to change in design, ordering and relationships, with only one preferred and practical embodiment being illustrated and specified as is required.

BRIEF DESCRIPTION OF DRAWINGS

In the accompanying drawings wherein like numbers of reference refer to similar elements throughout:

FIG. 1 is an expanded view of a typical solid state recorder showing its various elements, their configuration and relationship.

FIG. 3 is a pattern of individual scanned fields in a SSTR.

FIG. 4 is a graph of the relationship between observed track density $\tau_0$ and true track density $\tau$ given by the analytical methods of one process.

FIG. 5 shows a third order polynomial least squares fit of true track density $\tau$ as a function of average pixel light level $\lambda$.

DESCRIPTION OF THE PREFERRED EMBODIMENT

Figure 2:
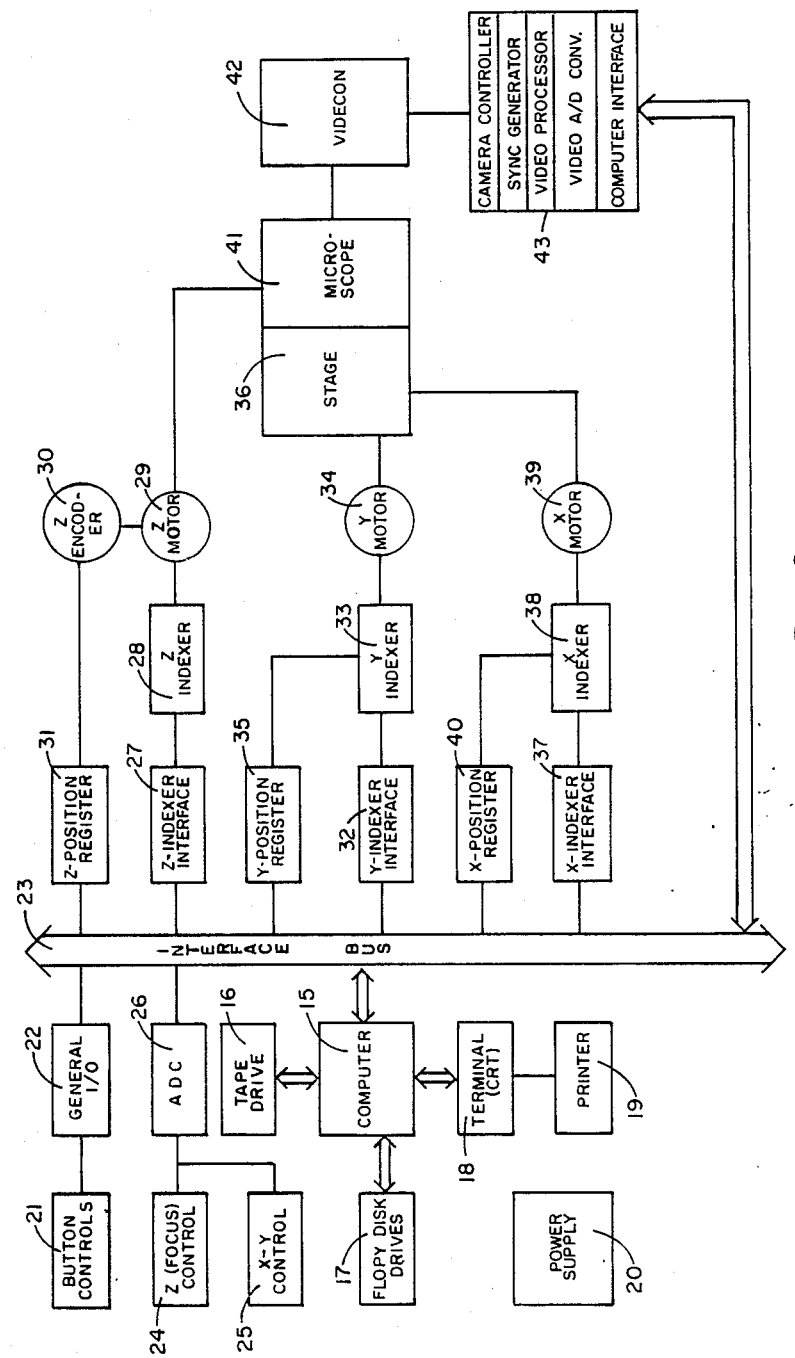
FIG. 2 is a block diagram of a typical computer operated automated scanning system for solid state track recorders.

A typical solid state track recorder (SSTR) with which my process is designed to operate is illustrated generally in FIG. 1. Such recorders provide annular case 10, generally of cylindrical configuration as illustrated, and typically formed of aluminum, steel, cadmium or gadolinium. The case normally is provided with a cylindrical radiation transparent face plate 11 through which radiation will enter the device and has appropriate thickness to contain a track recorder 13 and its fission deposit 14 and fastenably receive face plate 11 within its inner chamber 12. The track recorder is of disk-like configuration adapted to fit within chamber 12 and generally is formed of mica, quartz or one of the carbonate plastics. This track recorder carries fission deposit 14 on its input facing surface. Commonly the fission deposit will be an actinide isotope, such as NP-237 or U-238, and in the present day it is most commonly established in place by electro-sputtering or vacuum vaporization, though it may remain a separate and distinct element if desired. It is necessary, however, for effective operation of the fission deposit that it be in immediate contact with the adjacent surface of the track recording material. Face plate 11 forms a disk-like cap to fit within internal chamber 12 of the case to cover the track recorder and fission deposit. The cap again is formed of aluminum or cadmium because these material are transparent to neutrons of relevant energies and is positionally maintained by a seal about its peripheral surface adjacent the case element. This sealing is accomplished mechanically such as by threading, by adhesion or otherwise.

In operation, neutrons will enter the device through face plate 11 or chamber 12 and thence will enter deposit 14. As this happens, a reaction will occur with the material of the deposit which produces an alpha particle or some other fission fragment. These secondary reaction products then pass into track recorder 13 where they leave a physically differentiated track in the recorder material which may be made optically distinguishable by appropriate chemical etching. The tracks that are produced are essentially randomly oriented lines or curves within the three dimensional structure of the recording material.

Both the SSTR's and their function and use are well known in the prior art and this knowledge has been documented in the patent and general literature by works of the present inventors and others. In view of this, the details of both the device itself and its operation are not specified with any detail as they are not an essential part, per se, of the instant invention, but rather only constitute subject matter upon which the invention operates.

The fission tracks in such SSTR's, once processed to render them optically distinguishable, are counted to give a measure from which neutron radiation having impinged upon the SSTR may be measured. This counting in the present day is commonly accomplished by automated optical scanning.

The basic elements that comprise a modern automated scanner are shown in the diagram of FIG. 2. An optical scanning microscope 41 and stage 36 are operated by computer 15 which is serviced by magnetic tape storage 16, commonly for data, and floppy disk drives 17, commonly for providing instructional programs. The computer in turn displays its output through CRT terminal 18 or printer 19, as desired, and is provided with operating power by power supply 20. These computer components are provided by any medial to larger sized personal computer system.

Push button control 21 for a specific scanning device communicates through general purpose input/output board 22 to the computer's main bus 23. The Z-axis or focus control 24 and the XY-axes controls 25 communicate through control board 26, again to computer bus 23.

The Z-indexer or interface 27 is driven from the main computer bus to provide control data to Z-axis indexer 28 which in turn controls Z-axis motor 29 to regulate the focus of the microscope. The Z-axis motor passes its positional information through the Z-axis encoder 30 to Z-position register 31 which in turn communicates the information back to the computer through bus 23. The Z-motor drives the focus control of a microscope to maintain focus for the scanning operation.

The Y-indexer or interface 32 communicates from computer bus 23 through Y-indexer 33 to Y-motor 34 controlling microscope stage 36 in the direction of the Y-axis. The Y-indexer in turn communicates its positional information to the computer through Y-position register 35 which communicates back to computer bus 23. The X-axis controls communicate in the same fashion between X-indexer interface 37, X-indexer 38 and X-axis motor 39, with X-axis position register 40 returning positional information to the computer system through bus 23. The XY-controls, through motors 34, 39 move microscope stage 36 to scan a particular track recorder on that stage relative to computer supplied instructions.

As any individual area of the microscope stage, and particularly a track recorder located thereon is scanned, the information is optically presented to vidicon screen 42 which in turn, through counter device 43, including a camera controller, synchronization generator, video processer, video converter and computer interface, transmits that information in computer cognizable form through computer bus 23 to the computer where it may be further processed.

Such mechanism scans a plurality of individual areas 44 of an entire field. These individual areas commonly comprise the medial portion of a solid state track recorder and are generally arrayed in perpendicular columns and rows, as illustrated in FIG. 3. Each of the areas 44 will normally constitute a vidicon field. Commonly, the periphery 45 of a solid state track recorder will be somewhat larger than the field 46 counted for track registration to avoid peripheral boundary induced errors. Though individual vidicon fields 44 in FIG. 3 are illustrated in a rectilinear raster-type pattern, they may be otherwise defined, though the raster pattern illustrated is generally the simplest to deal with for analysis and the most common in present day use.

Such a system with computer control of X, Y and Z-axes of a microscope permits scanning of an SSTR by moving sequentially from one videcon field to the next in a raster-like pattern. Since the optical magnification can vary in scanning processes from approximately 100× 1000×, many individual fields must be scanned to completely cover an SSTR which typically possess dimensions in the order of several centimeters. For example, in using a magnification of approximately 200× to cover a circular SSTR of one centimeter diameter will require scanning of more than 200 videcon fields.

This equipment described for scanning and counting nuclear tracks in SSTR's again is known per se and substantial literature in both the patent and general scientific fields describes it and its functions in detail.

PARALYZABLE COUNTER METHOD (PCM)

The track density $\tau_0$ observed with an automatic scanning system is not the true track density $\tau$, but rather is less than the true track density ($\tau_0 \leq \tau$) because of track overlap or pile up. The simplest algorithm to use under computer controlled scanning is to simply record any degree of track overlap, no matter how many tracks are involved, as a single track and this custom and practice has developed in the nuclear track scanning field.

This algorithm was used in the earliest automated SSTR scanning efforts and it was there and then shown that in this type of paralyzable counter model (PCM) that the true track density $\tau$ is related to the observe track density $\tau_0$ by the transcendental relation $$\tau_0 = \tau \exp(-\alpha\tau) \tag{1}$$

Here $\alpha$ is a constant related to the average area for track pile up in the SSTR. This relation between $\tau$ and $\tau_0$ is displayed in FIG. 4. For an SSTR having a non-uniform track density, the observed and true track densities can vary widely from one vidicon field to the next. In each field, one can apply equation (1), supra, to determine the true track density $\tau$ from the observed track density $\tau_0$. The total number T of tracks registered on the SSTR is simply obtained by summing the results over all the vidicon field. Consequently, this relationship can be represented as $$T = A_f \cdot \Sigma \tau_i \tag{2}$$

where $\tau_i$ is a true track density of the $i^{th}$ field and $A_f$ is the area of a field, assuming all fields to be of uniform area.

The primary problem in applying this procedure lies in the determination of the true track density $\tau$ from the observed track density $\tau_0$. It can be seen from FIG. 4 that accurate determinations or $\tau$ are reasonably possible only in Region 1 of the graph of FIG. 4. In fact for Region 2, near the broad maximum of the curve, the accuracy of $\tau$ can be very poor. This has been shown rigorously in some of the earliest writings concerning the PCM method of analysis for relative variance of $\tau$, $\sigma^2(\tau)/\tau^2$, was obtained in the form $$\sigma^2(\tau)/\tau^2 = [1 - 2\alpha\tau \cdot \exp(-\alpha\tau)]/(1-\alpha\tau)^2 \cdot 1/T + [\alpha\tau/(1-\alpha\tau)]^2 \cdot \sigma^2(\alpha)/\alpha^2 \tag{3}$$

Here the first term stems from the statistical uncertainty of counting total tracks and the second term results from calibration uncertainty in determining the consent $\alpha$. It is evident that both terms in Equation (3) diverge for $\alpha\tau \to 1$. Since the point $\alpha\tau = 1$ defines the maximum of the curve in FIG. 4, it is clear that the uncertainty in $\tau$ becomes unacceptably large in Region 2.

Similar difficulties arise in Region 3, especially at very high track density where the slope of the curve becomes small. In this region, that is for large $\alpha\tau$, the uncertainty in the $\tau$ determination is also unacceptably large. Consequently this standard PCM procedure can be carried out accurately only in Region 1. However, for non-uniform SSTR's the true track density generally varies over all three regions and this requires a new approach to the automated scanning of the SSTR in Regions 2 and 3.

BUFFON NEEDLE (BN) METHOD

In the instant invention, a different approach to determining true track density is applied in each region of the curve shown in FIG. 4. The standard procedure based on the PCM method works well in Region 1. The procedure we have developed for Region 2 is based on the Buffon needle (BN) method which is based on random sampling of the SSTR surface to measure the probability, p, of observing tracks without pile up. For Region 3, a new method based on the fraction of light transmitted has been conceived.

To apply the Buffon needle (BN) method, random sampling is used to measure the probability, p, of observing tracks without pile up. This probability is related to the true track density $\tau$ by the simple formula heretofore known $$p = \exp(-\beta\tau) \quad (4)$$

where $\beta$ is the characteristic area for track pile up (which has generally been called the Buffon area). The true track density is obtained by measuring the probability, p, and solving equation (4) for $\tau$ in terms of p. Doing this, one has the simple relation $$\tau = -\beta^{-1} * \ln p \quad (5)$$

When automated scanning is performed using the PCM algorithm as described above, it is simple to obtain the area in each field that is covered by tracks. Let $A_c$ be the area in each field that is covered by tracks and let $A_y$ be the uncovered area in each field. Since $A_f$ is the area of the entire field, one has $$A_f = A_c + A_y. \quad (6)$$

Division of equation (6) by $A_f$ yields $$1 = A_c/A_f + A_y/A_f. \quad (7)$$

Here $A_c/A_f$ is the fraction of area covered by tracks in the field. The uncovered fraction of area in the field, $A_y/A_f$, is simply the probability, p, for recording tracks without pile up, so that $$A_y/A_f = p. \quad (8)$$

Consequently equation (7) can be rewritten as $$p = 1 - A_c/A_f. \quad (9)$$

Hence equation (9) provides a simple relation that can be used to obtain the probability, p, for each field from the observed fraction of area covered $A_c/A_f$ in that field. Using the value of p so generated, the BN method can be applied by using equation (5) to determine the true track density $\tau$.

In theory, the constant $\alpha$ of the PCM method and the constant $\beta$ of the BN method are identical. The two constants are not represented by the same symbol, however, because in practice the values of these constants are determined from two different calibration experiments using automated scanning systems. The calibration constant of the PCM system, $\alpha$, is determined by scanning a set of standard SSTR's of known track density. These SSTR's must be uniform and preferably provide adequate coverage of Region 1. The details of this calibration procedure have been well explained in the earliest automated SSTR scanning literature as well as more recently in literature relating to vidicon based systems.

It has already been shown that the constant of the BN method, $\beta$, can be determined by applying the BN method itself. This can be accomplished by employing a standard set of uniform SSTR's that provide adequate coverage of Region 2 of the graph of FIG. 4. However, there is another way to determine $\beta$ that dispenses with the need for this standard set. This novel calibration of the BN method can be accomplished during the actual scanning of the non-uniform SSTR by employing the PCM results. In those fields where the PCM method is applicable, say m fields where m<n, the true track density is determined. The probability, p, can be determined in these m fields of Region 1 by measuring the fraction of area covered in these m fields and applying equation (9). Using these $\tau$ and p values in equation (4) yields the desired value of $\beta$. In fact, from equation (4) one simply has $$\beta = -\tau^{-1} * \ln p. \quad (10)$$

Equation (10) can be used for each of the m fields in Region 1, so that an array of $\beta$ values, $\beta_i$, is generated. The mean of this array $$\beta = 1/m * \sum_{i=1}^{m} \beta_i \quad (11)$$

will provide a very accurate determination of the constant needed to apply the BN method.

Since these two constants are determined empirically, one would expect their actual values to be approximately equal. Using this approximate relation, one can combine equations (4) and (9) to give $$p = 1 - A_c/A_f \approx \exp(-\alpha\tau). \quad (12)$$

While equation 12 is only approximate, it is a fundamental relation that can be used to determined an approximate value of $\alpha\tau$ from the fraction of area covered ($A_c/A_f$) in the field. This approximate value of $\alpha\tau$ is then used to locate in which Region, either 1, 2 or 3, the given field lies. As shown in FIG. 4, Region 1 corresponds to $\alpha\tau < 1$, Region 2 corresponds to $\alpha\tau \sim 1$, and Region 3 corresponds to $\alpha\tau > 1$. Consequently the fraction of area covered ($A_c/A_f$) can be used as an index to determine in which Region a given field lies and therefore which of the three methods should be applied to determine $\tau$ in that field.

LIGHT TRANSMISSION (LT) METHOD

In automated SSTR scanning, the light level of each pixel $\lambda_i$ is digitized by an ADC and the result is available for processing by a computer. For example, the total light level L in a vidicon field is easily obtained since $$L = \sum_{i=1}^{m} \lambda_i \tag{13}$$

where n is the total number of pixels in a field. The total light level can also be expressed in the form $$L = n*\bar{\lambda} \tag{14}$$

where $\bar{\lambda}$ is the average pixel light level of the field, which is simply $$\bar{\lambda} = 1/n * \sum_{i=1}^{m} \lambda_i \tag{15}$$

Since the number of pixels, n, is usually constant in automated SSTR scanning, $\bar{\lambda}$ is proportional to L. Consequently $\bar{\lambda}$ can often be used instead of L in computer operations and algorithms, which can be most convenient.

Now the total light level from a vidicon field is a measure of the light transmission through the microscope for the given field under observation. If the vidicon views a field that contains no tracks, then the light transmission, L, will be a maximum, that is, $L = L_{max}$. If a field becomes entirely filled with tracks, the light transmission will vanish, that is $L = 0$. Hence if a given field possesses a light transmission L, the fractional light transmitted, $f_L$, is simply $$f_L = L/L_{max} = \bar{\lambda}/\bar{\lambda}_{max}. \tag{16}$$

Since $\bar{\lambda}_{max}$ is a constant, one finds that $f_L$ is proportional to $\bar{\lambda}$.

The LT method is an empirical procedure. Application of an empirical method in Region 3 is suggested by the behavior of the PCM in that Region. Indeed FIG. 4 shows that $\tau_0$ is a monotonically decreasing function throughout Region 3. Based on this behavior, one consequently would expect $\tau$ to monotonically increase with decreasing $f_L$.

To determine the empirical relation between $\tau$ and $f_L$, a number of SSTR standards are prepared having track densities in Region 3 of the graph of FIG. 4. These standards must be uniform and have known true track densities. These standards are then run on an automated scanning system so that an observed value of $f_L$ is determined for each uniform standard of known true track density $\tau$.

In this way, one determines data points in $(\tau, f_L)$ space. These data points can then be used to determine an empirical relation between $\tau$ and $f_L$ in Region 3. The least squares method is readily available on software for most computers to analyze this data set. In this method, one assumes that $\tau$ is some function F of the variable $f_L$ and a set of parameters $(a_L)$. Hence this assumption can be written $$\tau = F(f_L, a_1, a_2 \ldots a_m). \tag{17}$$

The assumed function F and the data set $(\tau, f_L)$ are used as input to the least square code which then generates the best set of parameters $(a_L)$, in a least square sense, for fitting the $(\tau, f_L)$ data with the functional form F.

An example of the results obtained from this procedure is shown in the graph of FIG. 5. Here it was assumed that $\tau$ is given by a third order polynomial in $\bar{\lambda}$, $$\tau = a_1 + a_2\bar{\lambda} + a_3\bar{\lambda}^2 + a_4\bar{\lambda}^3 \tag{18}$$

so that $\tau$ depends continuously on $\bar{\lambda}$.

The accuracy of the fit depends on the accuracy of the SSTR standards and the stability of the automated scanning system. As can be seen in FIG. 5, the fit is quite good. Moreover, the least square codes provide variance and co-variance information that can be used to determine the uncertainty in the value of $\tau$ that is obtained from the empirical relation.

COMPLEMENTARITY OF THE THREE METHODS

It has already been shown that the uncertainty in the PCM becomes unacceptably large outside of Region 1, as shown in the graph of FIG. 4. In the BN method, the uncertainty in $\tau$ is given by $$\sigma^2(\tau)/\tau^2 = \sigma^2(\beta)/\beta^2 + (\ln p)^{-2}*(p^{-1}-1)/n \tag{19}$$

where n is the number of random trials used to determine p. The first term of equation (19), which represents the uncertainty in $\beta$, stems from uncertainties that arise in the calibration experiment used to determine $\beta$. The second term in equation (19) represents the uncertainty in the determination of p. For automated systems, n is simply the number of pixels used in the analysis of each vidicon field.

The second term in equation (19) diverges for $p \to 0$ and also for $p \to 1$. Hence the uncertainty provided by the BN method becomes unacceptably large in two regions, namely for p near 0 for p near unity. Using equation (12) one finds that the region around $p = 0$ corresponds to large $\alpha\tau$, which is Region 3 and the region around $p = 1$ corresponds to small $\alpha\tau$ which is Region 1, hence the BN method provides accurate values of $\tau$ only in Region 2.

In contrast with the PCM method, one cannot expect accurate results from the LT method in Region 1. This follows from the relation between the variance of $\tau$, $\sigma^2(\tau)$, and the variance of $f_L$, $\sigma^2(f_L)$, which is simply $$\sigma^2(\tau) \approx (d\tau/df_L)^2 * \sigma^2(f_L). \tag{20}$$

Consequently, the uncertainty in $\tau$ will depend chiefly on the derivative $(d\tau/df_L)$. At low track density, where the vidicon field is predominately vacant, large changes in $\tau$ will produce very little change in $f_L$. Hence $d\tau/df_L$ will be large in Region 1, so that large uncertainties arise if the LT method is applied in that region. Conversely, only if the track density is high enough, will $f_L$ change substantially with changes in $\tau$. This is illustrated by the example depicted in FIG. 5. Here the fractional derivative $[\tau^{-1}*(d\tau/df_L)]$ increased by over three orders of magnitude and going from $\bar{\lambda} = 50$ where the track density is high to $\bar{\lambda} = 190$ where the track density is low. Since the accuracy of the LT method improves with increasing track density, the LT method should be applied in Region 3. In the limiting case, where track density is very high and the SSTR is completely covered, the vidicon field is entirely covered and no method is applicable.

Hence, the PCM, BN and LT methods should be used in Regions 1, 2 and 3 respectively. Because of the way the uncertainty intrinsically varies in each method, these three methods complement one another ideally. The combined use of the three methods provides accurate values of $\tau$ for non-uniform SSTR's over a very broad domain of track density.

The automated scanning procedures set forth comprise three separate methods of determining true track density in solid state recorders. With each scanning process, different observables are recorded, one for each method, as set forth in Table 1.

TABLE 1

| Method | Region | Observable |
|--------|--------|------------|
| PCM | 1 | Observed track density, $\gamma_0$ |
| BN | 2 | Probability p or fraction of area covered, $A_c/A_f$ |
| LT | 3 | Fractional light transmitted $f_L$ or average pixel light level $\bar{\lambda}$. |

An index is identified and used to select which of the three methods is applicable to a given field. The selected method is then used to determine $\tau$ as well as the resultant uncertainty in the $\tau$ determination. The use of the probability, p, as such an index or the fraction of the area covered, $(A_c/A_f)$, have already been described. Other indices that can be used for this purpose are $f_L$ or equivalently $\bar{\lambda}$. The observed distibution of track sizes can be used to obtain other indices. Since track overlap or pile up increases as track density increases, the relative occurance of large size tracks will increase with increasing track density. Consequently, the track size distribution can be used to determine additional indices that can be used on a field by field basis to decide which of the three methods should be applied.

The use of more than one index is not precluded and could have distinct advantages and improved reliability. Moreover, one index might be applicable to resolving the boundary between Regions 1 and 2, whereas a different index could give better resolution of the boundary between Regions 2 and 3.

By reason of the novel combination of the three complementary methods, our procedure may obtain absolute accuracy in track density measurements of a few percent. It is applicable over track density ranges of approximately three orders of magnitude from roughly $5*10^4$ to $5*10^7$ tracks/cm$^2$. The hardware and software requirements of our procedure can readily be adapted for use on modern day computer controlled SSTR scanning systems.

The foregoing description of our invention is necessarily of a detailed nature so that a specific embodiment of it might be set forth as required, but it is to be understood that various modifications of detail, rearrangement and multiplation of steps might be resorted to without departing from its spirit, essence or scope.

Having thusly described our invention, what we desire to protect by Letters Patent, and

What we claim is:

1. The method of determining true track density from an observed track density in solid state track recorders by optically scanning a plurality of areal fields of the recorder in two dimensions, with any connected ray of tracks being considered as a single track, comprising in combination:

determining the functional relationship between the observed number of tracks and the actual number of tracks at a plurality of different track densities by different methods;

determining the true track density in any particular individual areal field by applying the method having least uncertainty in that field; and summing the so determined true track densities of least uncertainty in the areal fields measured to determine the true track density of the solid state track recorder to be measured.

2. The method of claim 1 wherein the methods of determining the functional relationship between the observed number of tracks and the actual number of tracks include at least two methods chosen from the group consisting of:

empirically determining the average area for track pile up by the paralyzable counter method;

randomly sampling track density to determine the probabilty of track pile up by the Buffon needle method; and measuring light transmissibility to determine track density by the light transmission method.

3. A method for determining true track density from a track scan of a solid state track recorder of a dosimeter, wherein the track scan considers any connected array of lines and points as a single track, comprising the steps of:

determining observed track density in each of a plurality of areal fields of the solid state track recorders by optically scanning the recorder in two dimensional space;

determining a true track density by a first method of determining a function representing the average area for track pile up and applying that function to observed track density;

determining a true track density by a second method of calculating the probability of track overlap based upon track density and applying that probability to observed track density;

determining a true track density by a third method of observing the amount of light transmitted through an observed field compared to light transmitted through that field if without tracks and applying that function to observed track density;

applying only one of aforesaid methods of determining true track density in a particular measured field where that method has higher accuracy;

summing all such true track densities over all observed fields to determine true track density of a solid state track recorder.

4. The method of claim 3 wherein it is assumed that track density $\tau_0$ is determined from true track density $\tau$ by the relationship $$\tau_0 = \tau * \exp(-\alpha\tau)$$

and the exponent $\alpha\tau$ is used as an index to determine the analysis method to be used in areas of particular track density with the first method being used when $\alpha\tau$ is less than 1, the second method being used when $\alpha\tau$ is approximately 1 and the third method being used when $\alpha\tau$ is greater than 1.

5. A method for measuring true track density from observed track density in an optically transparent solid state track recorder, comprising the steps of:

determining the amount of light transmitted through a given area $A_0$ of the solid state track recorder having no tracks recorded therein;

determining the amount of light transmitted through a plurality of similar areas $A_i$ from a number of similar solid state track recorder standards with tracks registered therein;

determining from measurements of said standards a function $F_0$ relating true track density to light transmission in each $A_i$ measured;

determining true track density of each area $A_i$ by applying the aforesaid function Fo to the light transmission in each $A_i$; and summing the true track density so determined over all areas $A_i$ to determine true track density of the solid state track recorder.

* * * * *